US012166291B2

(12) United States Patent
Guan et al.

(10) Patent No.: US 12,166,291 B2
(45) Date of Patent: Dec. 10, 2024

(54) COAXIAL FEED FOR MULTIBAND ANTENNA

(71) Applicant: Sea Tel, Inc., Concord, CA (US)

(72) Inventors: Wei-Jung Guan, Walnut Creek, CA (US); Rami Adada, Walnut Creek, CA (US)

(73) Assignee: Sea Tel, Inc., Concord, CA (US)

( * ) Notice: Subject to any disclaimer, the term of this patent is extended or adjusted under 35 U.S.C. 154(b) by 0 days.

(21) Appl. No.: 18/127,642

(22) Filed: Mar. 28, 2023

(65) Prior Publication Data

US 2023/0246334 A1 Aug. 3, 2023

Related U.S. Application Data

(63) Continuation of application No. 16/908,356, filed on Jun. 22, 2020, now Pat. No. 11,641,057.

(60) Provisional application No. 62/865,631, filed on Jun. 24, 2019.

(51) Int. Cl.
*H01Q 19/19* (2006.01)
*H01Q 5/378* (2015.01)
*H01Q 5/47* (2015.01)

(52) U.S. Cl.
CPC ............ *H01Q 5/378* (2015.01); *H01Q 19/19* (2013.01)

(58) Field of Classification Search
CPC ........ H01Q 5/378; H01Q 5/47; H01Q 13/065; H01Q 19/134; H01Q 19/19
See application file for complete search history.

(56) References Cited

U.S. PATENT DOCUMENTS

| | | | |
|---|---|---|---|
| 5,642,121 | A | 6/1997 | Martek et al. |
| 6,222,492 | B1 | 4/2001 | Mahon |
| 6,982,679 | B2 | 1/2006 | Kralovec et al. |
| 8,542,156 | B2 | 9/2013 | Patel |
| 9,000,995 | B2 | 4/2015 | Blaney |
| 9,466,889 | B2 | 10/2016 | Patel |
| 9,882,261 | B2 | 1/2018 | Blaney |
| 10,135,112 | B1 | 11/2018 | Hosseini |
| 2002/0175875 | A1 | 11/2002 | Verstraeten |
| 2008/0001686 | A1 | 1/2008 | Chao et al. |
| 2008/0297428 | A1 | 12/2008 | Wu |
| 2010/0328188 | A1 | 12/2010 | Chang et al. |
| 2014/0057576 | A1 | 2/2014 | Monte et al. |

(Continued)

OTHER PUBLICATIONS

Granet, C., et al., *A Dual-Band Feed System for the Parkes Radio Telescope*, Antennas and Propagation Society International Symposium, 2001, IEEE, vol. 2.

(Continued)

*Primary Examiner* — Hoang V Nguyen
(74) *Attorney, Agent, or Firm* — Santa Fe IP, LLC

(57) ABSTRACT

A coaxial feed for multiband antenna for a multiband antenna includes: a tubular high-band (HB) waveguide, the HB waveguide including an outer conducting surface, an inner HB conducting surface, and a HB aperture defined by the inner HB conducting surface; a tubular low-band (LB) waveguide disposed coaxially around the HB waveguide, the LB waveguide including an outer feed surface, an inner LB conducting surface, and an annular LB aperture defined by the inner LB conducing surface and the outer conducting surface of the HB waveguide; and an annular high-band (HB) choke located in the outer conducting surface of the HB waveguide, the HB choke being axially offset from the HB aperture.

20 Claims, 3 Drawing Sheets

(56) References Cited

U.S. PATENT DOCUMENTS

| | | | |
|---|---|---|---|
| 2016/0104941 | A1 | 4/2016 | Lee et al. |
| 2016/0365634 | A1 | 12/2016 | Williams |

OTHER PUBLICATIONS

Granet, C., et al., *Design of a Prime-Focus Dual-Band Feed for the Giant Metre-Wave Radio Telescope in India*, Workshop on the Applications of Radio Science, 2006, Leura, NSW, Australia.
Granet, C., et al., *Theoretical Design of a Simultaneous Ku/Ka-Band Feed-System*, Proceedings of the Fourth European Conference on Antennas and Propagation, 2010, IEEE, Barcelona, Spain.
Kim, Y, et al., *Shaped Circularly Symmetric Dual Reflector Antennas by Combining Local Conventional Dual Refletor Systems*, IEEE Transactions on Antennas and Propagation, 2009, vol. 57, No. 1.

COAXIAL FEED FOR MULTIBAND ANTENNA

CROSS-REFERENCES TO RELATED APPLICATIONS

This application is a Continuation of U.S. patent application Ser. No. 16/908,356 filed Jun. 22, 2020 and entitled COAXIAL FEED FOR MULTIBAND ANTENNA, which claims priority to U.S. Provisional Patent Application No. 62/865,631 filed Jun. 24, 2019 and entitled COAXIAL FEED FOR MULTIBAND ANTENNA, the entire contents of which applications are incorporated herein for all purposes by this reference.

BACKGROUND OF INVENTION

Field of Invention

This application relates, in general, to coaxial feeds for multiband antennas, and more particularly to coaxially feeds for multiband antennas used for satellite communications.

Description of Related Art

Coaxial feeds are well known in the tracking antenna field. For example, U.S. Pat. No. 6,222,492 discloses a dual coaxial feed having concentric waveguides including an inner waveguide for a "sum" radiation pattern and an outer waveguide for a "difference" radiation pattern. The dual coaxial feed also includes a variety of chokes near the open ends of the waveguides for improving and modifying impedance matches between free space and its coaxial waveguides.

Coaxial feeds may also be used with multiple band antennas, which are desirable for satellite communications because such antennas provide the ability to operate on multiple frequency bands. Coaxial feeds are particularly well suited for use with dual-band tracking antennas configured to track communications satellites. For example, U.S. Pat. No. 6,982,679 discloses a coaxial horn antenna system having a choke extending around the aperture of the inner horn to reduce currents on the outer surface of the inner horn to improve pattern performance.

One will appreciate that it may be desirable to operate a multiband antenna within frequency bands having wavelengths that are very close to one another, for example, operating a dual-band antenna in Ka and Ku bands. In the case of close frequency bands, the outer "low-band" coaxial waveguide may have an inner diameter that is relatively large compared to its outer diameter, which may cause unwanted cross polarization (X-pol) radiation. Radiation patterns are determined by the electric field at the radiation aperture, and larger inner diameters cause greater electric field bending at the aperture, which in turn leads to greater X-pol radiation.

It would therefore be useful to provide a multiband antenna with a choke structure that overcomes the above and other disadvantages of known coaxial-feed chokes.

BRIEF SUMMARY

One aspect of the present invention is directed to a coaxial feed for a multiband antenna, the coaxial feed including: a tubular high-band (HB) waveguide, the HB waveguide including an outer conducting surface, an inner HB conducting surface, and a HB aperture defined by the inner HB conducting surface; a tubular low-band (LB) waveguide disposed coaxially around the HB waveguide, the LB waveguide including an outer feed surface, an inner LB conducting surface, and an annular LB aperture defined by the inner LB conducing surface and the outer conducting surface of the HB waveguide; and an annular high-band (HB) choke located in the outer conducting surface of the HB waveguide, the HB choke being axially offset from the HB aperture.

The HB waveguide may be a Ka-band waveguide.

The HB waveguide may be dielectrically loaded with a dielectric member.

The dielectric member may have a relative permittivity equal to or greater than 2.

The dielectric member may be formed of a material selected from plastic, quartz, REXOLITE (cross-linked polystyrene) or a combination thereof.

The HB waveguide aperture may have a diameter in the range of approximately 0.2" to 0.33".

The HB choke may be axially offset from the HB aperture equal or larger than % wavelength of the LB frequency.

The offset of the HB choke may be configured to provide impedance matching to free space for LB frequencies of the LB waveguide.

The LB waveguide may be a Ku-band waveguide.

The LB aperture may have an LB aperture inner diameter in the range of approximately 0.22" to 0.35".

The LB aperture may have an LB aperture inner diameter, and the HB choke may have an HB choke inner diameter that is approximately equal to the LB aperture inner diameter.

The LB aperture may have an LB aperture inner diameter, and the HB choke may have an HB choke outer diameter that is greater than the LB aperture inner diameter.

The HB waveguide may be tuned for a HB frequency having an HB wavelength, and the HB choke outer diameter is approximately 0.1 to 0.25 times the HB wavelength larger than the LB aperture inner diameter.

The HB choke outer diameter ($OD_{HB\ Choke}$) may be determined:

$$ID_{LB\ Aperture}+0.1\lambda_{HB} \leq OD_{HB\ Choke} \leq ID_{LB\ Aperture}+0.25\lambda_{HB},$$

wherein $ID_{LB\ Aperture}$ is the LB aperture inner diameter, and $\lambda_{HB}$ is the HB wavelength.

The LB waveguide may include a radial groove in the inner conducting surface axially disposed between the LB aperture and the HB choke, the radial groove defining a corrugation configured and dimensioned to provide phase tuning for the HB waveguide.

The LB waveguide may include a secondary HB choke disposed around the annular LB aperture.

The LB waveguide may include a plurality of secondary HB chokes concentrically disposed around the annular LB aperture.

Another aspect of the present invention is directed to a multiband antenna system including: a primary reflector; a subreflector affixed relative to the primary reflector; and any one of the coaxial feeds described above, wherein the coaxial feed extends from the primary reflector toward the subreflector.

The antenna may further include a tracking pedestal supporting the primary reflector, the subreflector, and coaxial feed, the tracking pedestal configured for tracking communications satellites.

The system may further include: a HB diplexer positioned behind the primary reflector and operatively connected to a HB throat of the HB waveguide; a LB turnstile junction positioned around the HB diplexer and operatively connected to a LB throat of the LB waveguide; and a LB orthomode transducer and diplexer positioned behind and operatively connected to the LB turnstile junction.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
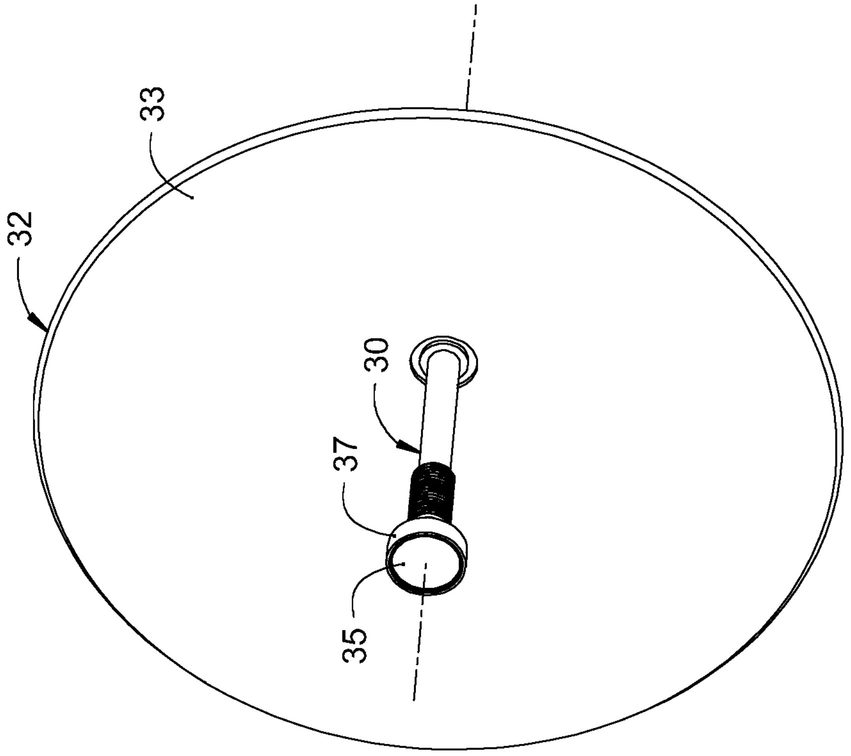
FIG. 1 is a perspective view of an exemplary coaxial feed for a multiband antenna in accordance with various aspects of the present invention.

Turning now to the drawings, wherein like components are designated by like reference numerals throughout the various figures, attention is directed to FIG. 1, which shows an exemplary coaxial feed 30 for a multiband antenna 32. The coaxial feed extends away from a primary reflector 33 and supports a subreflector 35 in a position that is affixed relative to the primary reflector in an otherwise conventional manner. For example, an RF-transparent subreflector support 37 may be utilized to support the subreflector on the end of the coaxial feed. In various embodiments, the multiband antenna is a circularly-symmetric dual-reflector antenna, in which both the primary reflector and the subreflector are circularly symmetric.

Figure 2:
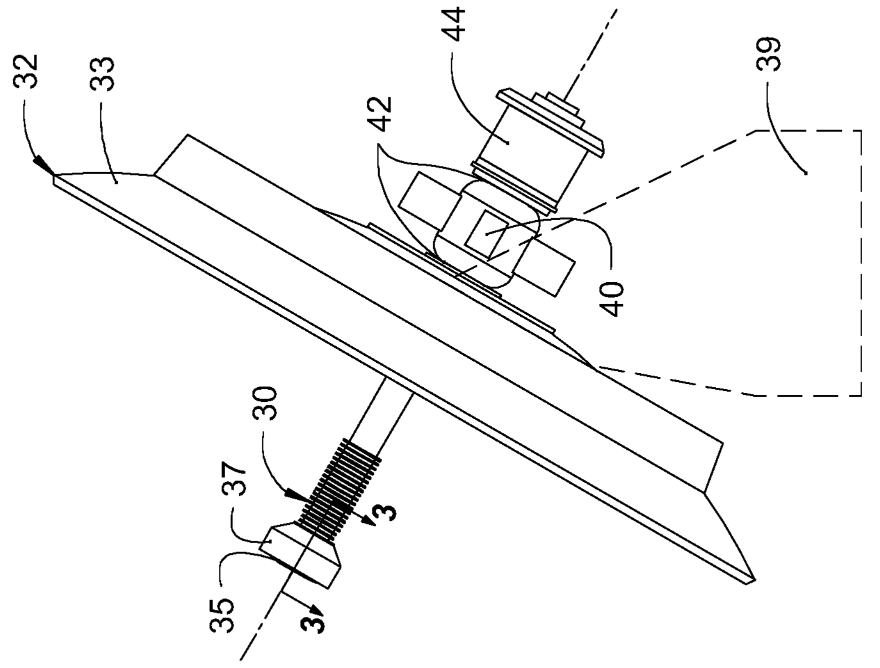
FIG. 2 is a side view of the coaxial feed and multiband antenna of FIG. 1.

With reference to FIG. 2, multiband antenna 32 may be operatively supported on a tracking pedestal 39 for tracking satellites and/or other moving communications devices in an otherwise conventional manner. The multiband antenna may also be provided with a high-band diplexer 40 operatively connected to an HB throat of an HB wave guide, a low-band turnstile junction 42 positioned around the HB diplexer and operatively connected to an LB throat of an LB waveguide, a low-band orthomode transducer and diplexer 44 positioned behind and operatively connected to the LB turnstile junction. One will appreciate that the multiband antenna may also be provided with other suitable equipment in an otherwise conventional manner.

Figure 3:
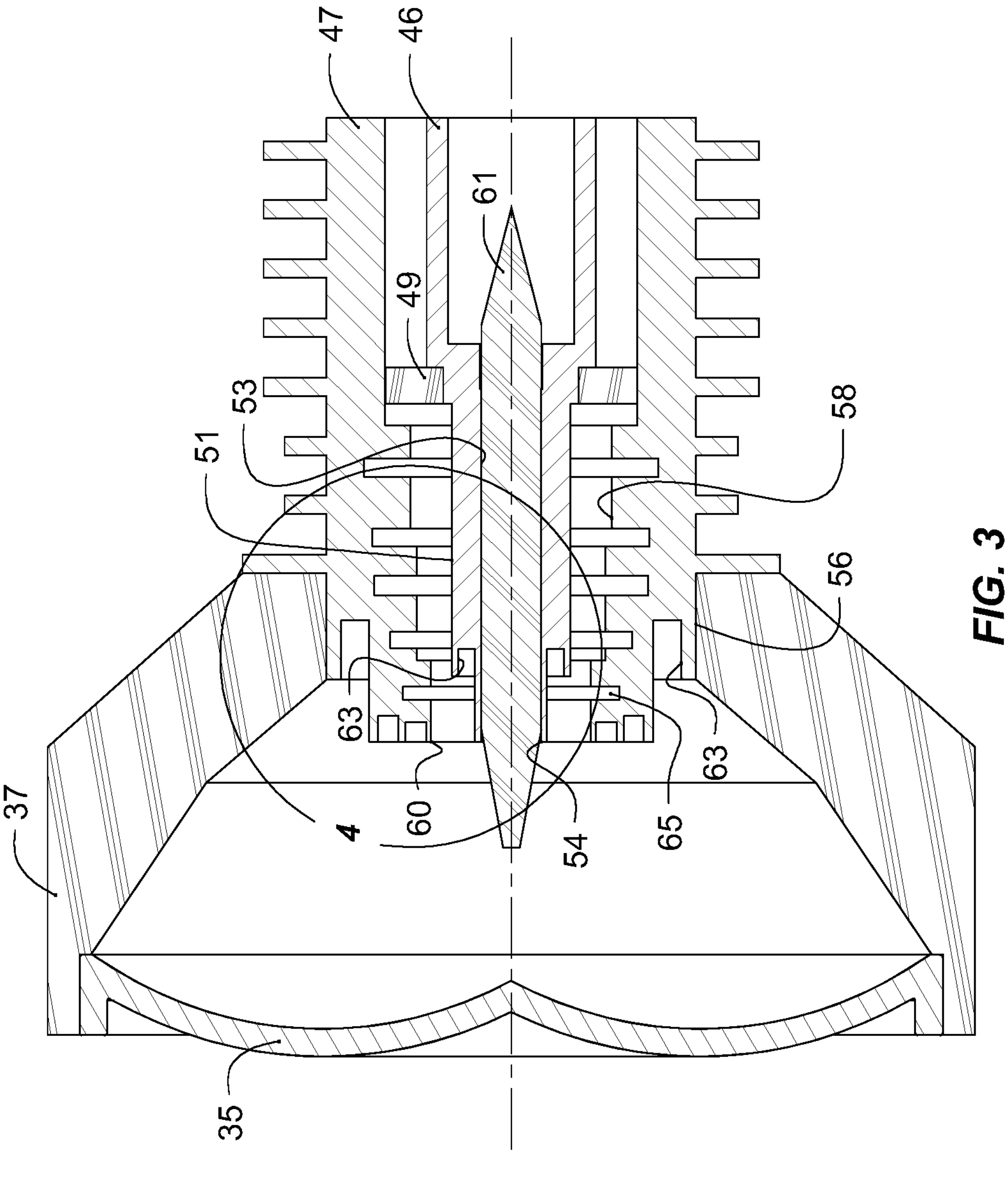
FIG. 3 is a cross-sectional view of the coaxial feed taken along line 3-3 in FIG. 2.

Turning now to FIG. 3, the coaxial feed generally includes a tubular high-band (HB) waveguide 46, a coaxial low-band (LB) waveguide 47 disposed around the HB waveguide and held in place by at least one RF-transparent coaxial support 49. The HB waveguide generally includes an outer conducting surface 51, an inner HB conducting surface 53, and a HB aperture 54 defined by the inner HB conducting surface, while the LB generally includes an outer feed surface 56, an inner LB conducting surface 58, and an annular LB aperture 60 defined by the inner LB conducing surface and the outer conducting surface of the HB waveguide.

One will appreciate that the multiband antenna may be configured as a dual band antenna, and each of the HB and LB waveguides may be configured dimensions to optimize reception and propagation of radio frequency waves of different frequencies. In various embodiments, the HB waveguide is configured as a Ka-band waveguide and the LB waveguide is configured as a Ku-band waveguide.

In accordance with various aspects of the present invention, HB waveguide may be dielectrically loaded with a dielectric member 61. Dielectrically loading the HB waveguide advantageously allows for a smaller HB aperture diameter, which in turn, allows for a smaller inner diameter of the LB aperture and improved cross polarization (X-pol) radiation performance. In particular, a smaller inner diameter of the LB aperture reduces electric field bending at the LB aperture and thus reduces unwanted X-pol radiation.

The dielectric member preferably has a relative permittivity equal to or greater than 2. Suitable materials for the dielectric member include plastic, quartz, REXOLITE (a cross-linked polystyrene manufactured by C-Lec Plastics, Inc. of Philadelphia, PA), a combination thereof, and/or other suitable materials.

In accordance with various aspects of the present invention, an annular high-band (HB) choke 63 is provided on the outer conducting surface 51 of HB waveguide 46 and axially offset away from HB aperture 54, as shown in FIG. 3. The offset of the HB choke is configured to provide impedance matching to free space for LB frequencies of the LB waveguide. In various embodiments, the HB choke is axially offset from the HB aperture a distance that is equal or larger than % wavelength of the LB frequency.

Figure 4:
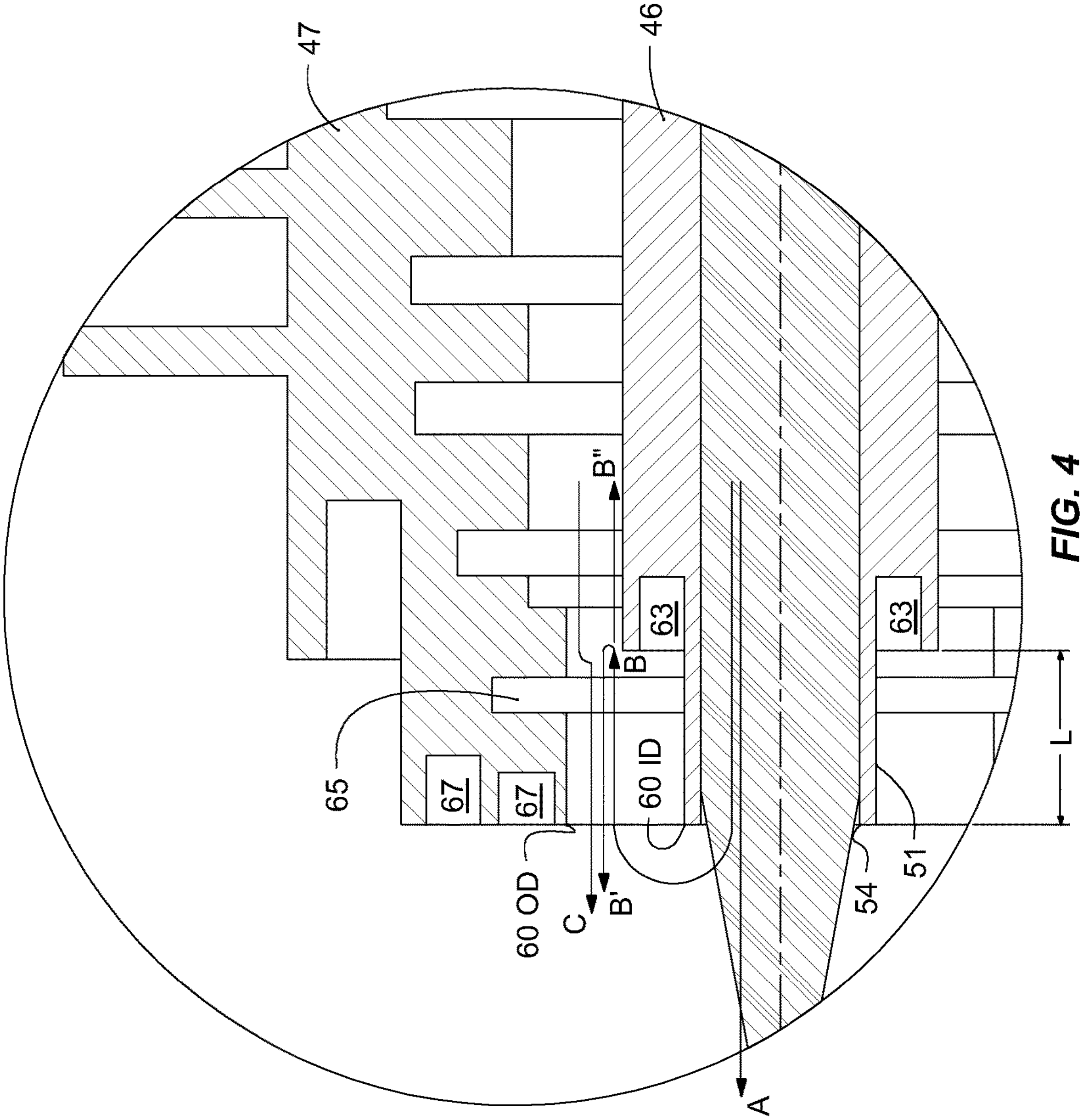
FIG. 4 is an enlarged detail of the coaxial feed shown in FIG. 3.

In operation, and with reference to FIG. 4, high-band radiation travels through HB waveguide 46 and radiates from the HB aperture 54. A majority of the wave energy radiates to free space (indicated by arrow A). However, some of the wave energy leaks onto the outer conducting surface 51 of the HB waveguide (indicated by arrow B). The axial offset of HB choke 63 may be properly tuned to reflect leaking wave energy back and re-radiate at the coaxial aperture (indicated by arrow B') thus minimizing wave energy leaking into LB waveguide 47 (indicated by arrow B").

The axial offset distance (D) of the HB choke determines the phase of the reflected wave energy (arrow B'). Preferably the majority of radiated wave energy (arrow A) and the reflected wave energy (arrow B') are in phase so that the majority and reflected wave energy are constructively combined to maximize radiation energy from the coaxial feed.

Accordingly, axially offset HB choke 63 allows for the optimization of high-band performance by reducing energy leakage into the coaxial LB waveguide 47 and phase tuning the reflected radiation energy (arrow B').

Significantly, the axial-offset HB choke configuration allows for the inner diameter of LB aperture 60 to be less than the outer diameter of HB choke 63. In various embodiments, the inner diameter of the LB aperture is approximately equal to that of the HB choke, as is shown in FIG. 4. Thus, the axial-offset configuration of the HB choke also allows for a smaller inner diameter of the LB aperture and improved cross polarization (X-pol) radiation performance.

Such configuration also allows for an outer diameter of the HB choke to be greater than the inner diameter than the LB aperture inner diameter. In various embodiments, HB waveguide 46 is tuned for a specific HB frequency and LB waveguide 47 is tuned for a specific LB frequency, for example Ka and Ku respectively. The axial-offset HB choke configuration allows the outer diameter of HB choke 63 to be larger than the inner diameter of LB aperture 60 by approximately 0.1 to 0.25 times the HB wavelength. For example, the HB choke outer diameter ($OD_{HB\ Choke}$) may be determined:

$$ID_{LB\ Aperture}+0.1\lambda_{HB}\leq OD_{HB\ Choke}\leq ID_{LB\ Aperture}+0.25\lambda_{HB}, \quad \text{Eq. (1)}$$

where $ID_{LB\ Aperture}$ is the LB aperture inner diameter, and $\lambda_{HB}$ is the HB wavelength.

In such cases, the HB/Ka-band waveguide aperture preferably has a diameter in the range of approximately 0.2" to 0.33", and the LB/Ku-band waveguide preferably has an LB aperture with an LB aperture inner diameter in the range of approximately 0.22" to 0.35". Preferably, the difference between the LB aperture inner diameter and the HB aperture diameter is merely the wall thickness of the HB waveguide. For example, the LB/Ku-band waveguide preferably has an LB aperture inner diameter in the range of approximately 0.21" to 0.35" when the HB waveguide has a tubular wall thickness of 0.01", and the LB/Ku-band waveguide preferably has an LB aperture inner diameter in the range of approximately 0.24" to 0.37" when the HB waveguide has a tubular wall thickness of 0.02".

Returning to FIG. 3, coaxial feed 30 may be provided with other tuning features to improve both high and low band performance. For example, LB waveguide 47 may include a radial groove 65 in its inner conducting surface 58 axially disposed between the LB aperture 60 and the HB choke 63. The radial groove may be configured and dimensioned to provide phase tuning of the reflected wave energy of HB waveguide 46 (arrow B') and the HB waveguide 46. The radial groove may also be configured to provide phase tuning of low-band radiation traveling through LB waveguide 47. In particular, HB choke may create a discontinuity of LB radiation (arrow C), in which case the radial groove may be tuned to provide additional phase tuning of the discontinuity whereby matching of LB radiation can be improved. Accordingly, the radial groove may be used to simultaneously optimize HB radiation performance and LB matching.

coaxial feed 30 may also include one or more aperture chokes 67 disposed around the annular LB aperture 60 to minimize undesired side lobes on the antenna radiation pattern. One will appreciate that such aperture chokes may be tuned to primary HB radiation, reflected HB radiation, or LB radiation in an otherwise conventional manner.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coaxial feed for a multiband antenna, the coaxial feed comprising:

a tubular high-band (HB) waveguide, the HB waveguide including an outer conducting surface, an inner HB conducting surface, and a HB aperture defined by the inner HB conducting surface;

a tubular low-band (LB) waveguide disposed coaxially around the HB waveguide, the LB waveguide including an outer feed surface, an inner LB conducting surface, and an annular LB aperture defined by the inner LB conducting surface and the outer conducting surface of the HB waveguide, the annular LB aperture being substantially coplanar and concentric with the HB aperture; and an annular high-band (HB) choke located in the outer conducting surface of the HB waveguide, the HB choke being positioned within the inner LB conducting surface and axially offset from the coplanar HB and LB apertures.

2. A coaxial feed according to claim 1, wherein the HB waveguide is a Ka-band waveguide.

3. A coaxial feed according to claim 2, wherein the HB waveguide is dielectrically loaded with a dielectric member.

4. A coaxial feed according to claim 3, wherein the dielectric member has a relative permittivity equal to or greater than 2.

5. A coaxial feed according to claim 3, wherein the dielectric member is formed of a material selected from plastic, quartz, cross-linked polystyrene, or a combination thereof.

6. A coaxial feed according to claim 5, wherein the HB waveguide aperture has a diameter in the range of approximately 0.2" to 0.33".

7. A coaxial feed according to claim 1, wherein the HB choke is axially offset from the HB aperture equal or larger than ¼ wavelength of the LB frequency.

8. A coaxial feed according to claim 1, wherein the offset of the HB choke is configured to provide impedance matching to free space for LB frequencies of the LB waveguide.

9. A coaxial feed according to claim 1, wherein the LB waveguide is a Ku-band waveguide.

10. A coaxial feed according to claim 9, wherein the LB aperture has an LB aperture inner diameter in the range of approximately 0.22" to 0.35".

11. A coaxial feed according to claim 1, wherein the LB aperture has an LB aperture inner diameter, and the HB choke has an HB choke inner diameter that is approximately equal to the LB aperture inner diameter.

12. A coaxial feed according to claim 1, wherein the LB aperture has an LB aperture inner diameter, and the HB choke has an HB choke outer diameter that is greater than the LB aperture inner diameter.

13. A coaxial feed according to claim 12, wherein the HB waveguide is tuned for a HB frequency having an HB wavelength, and the HB choke outer diameter is approximately 0.1 to 0.25 times the HB wavelength larger than the LB aperture inner diameter.

14. A coaxial feed according to claim 12, wherein the HB choke outer diameter (ODHB Choke) is determined:

$$IDLB\ \text{Aperture}+0.1\lambda HB \leq ODHB\ \text{Choke} \leq ID\ LB\ \text{Aperture}+0.25\lambda HB,$$

wherein IDLB Aperture is the LB aperture inner diameter, and λHB is the HB wavelength.

15. A coaxial feed according to claim 1, wherein the LB waveguide includes a radial groove in the inner conducting surface axially disposed between the LB aperture and the HB choke, the radial groove defining a corrugation configured and dimensioned to provide phase tuning for the HB waveguide.

16. A coaxial feed according to claim 1, wherein the LB waveguide includes a secondary HB choke disposed around the annular LB aperture.

17. A coaxial feed according to claim 16, wherein the LB waveguide includes a plurality of secondary HB chokes concentrically disposed around the annular LB aperture.

18. A multiband antenna system comprising:

a primary reflector;

a subreflector affixed relative to the primary reflector;

a coaxial feed according to claim 1, the coaxial feed extending from the primary reflector toward the subreflector.

19. A multiband antenna system according to claim 18, the antenna further comprising:

a tracking pedestal supporting the primary reflector, the subreflector, and coaxial feed, the tracking pedestal configured for tracking communications satellites.

20. A multiband antenna system according to claim 19, the system further comprising:

a HB diplexer positioned behind the primary reflector and operatively connected to a HB throat of the HB waveguide;

a LB turnstile junction positioned behind the HB diplexer and operatively connected to a LB throat of the LB waveguide; and a LB orthomode transducer and diplexer positioned behind and operatively connected to the LB turnstile junction.

* * * * *